July 16, 1957   J. R. STEIGERWALD   2,799,462
ANTI-SKID BRAKE SYSTEM FOR AIRCRAFT LANDING GEAR
Filed Nov. 10, 1954
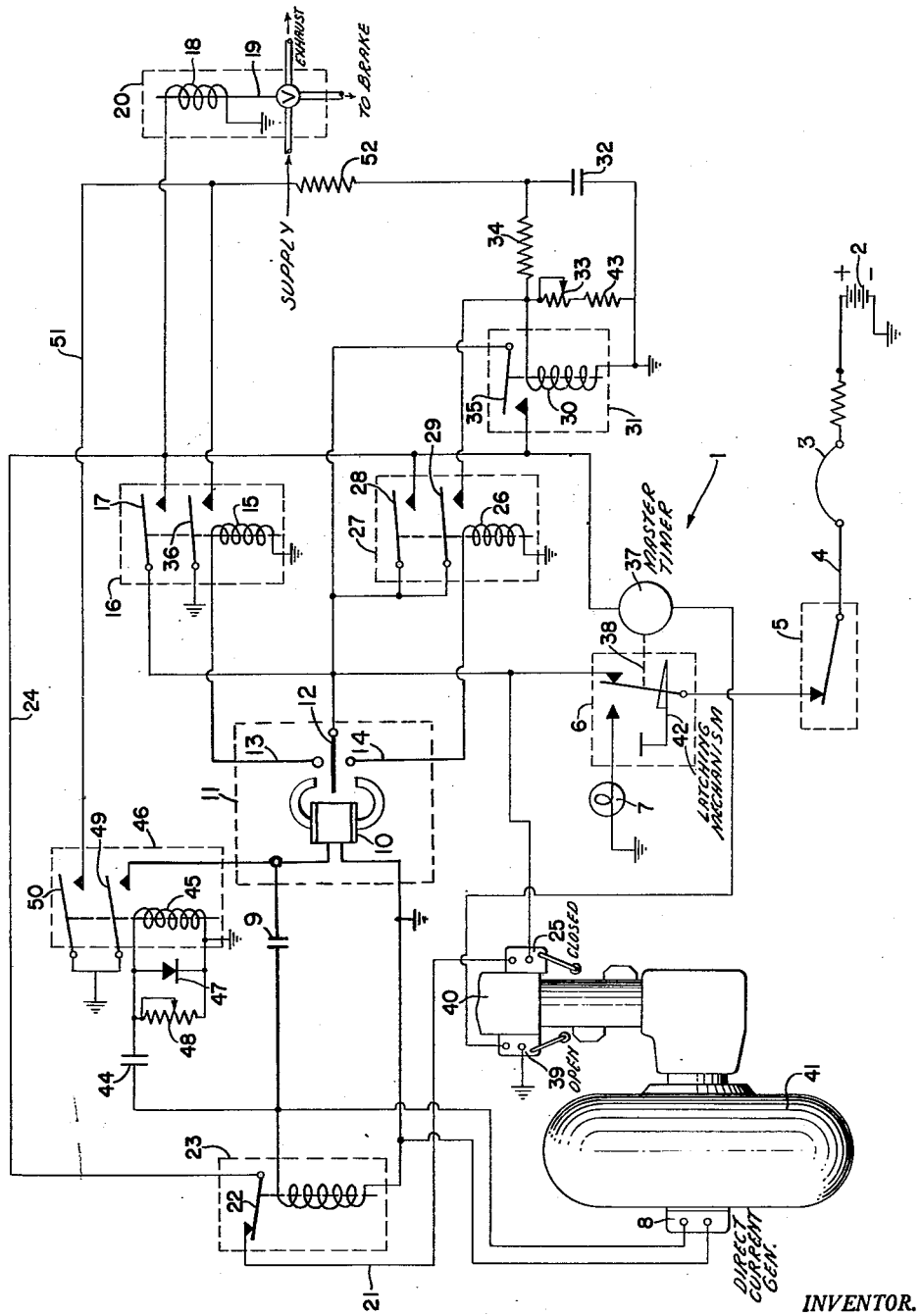
*INVENTOR.*
JOHN R. STEIGERWALD
BY
*R. L. Miller*
ATTORNEY

United States Patent Office 2,799,462
Patented July 16, 1957

---

2,799,462

ANTI-SKID BRAKE SYSTEM FOR AIRCRAFT LANDING GEAR

John R. Steigerwald, Canton, Ohio, assignor to The Goodyear Tire & Rubber Company, Akron, Ohio, a corporation of Ohio Application November 10, 1954, Serial No. 467,921

8 Claims. (Cl. 244—111)

This invention relates to anti-skid control mechanisms for brakes, and especially to electrically actuated mechanisms of the type particularly adapted for use with aircraft during the landing of an aircraft when it is highly desirable to brake as efficiently and effectively as possible without overbraking and consequent tire skidding action.

Different types of control means and electrical control circuits therefor have been provided in order to prevent the skidding of a braked wheel such as those on an aircraft during landing action. One of such systems is shown and described in my co-pending patent application with Mr. Mark I. Curl, Serial Number 451,812, filed August 24, 1954. The present control mechanism relates to an improvement on the apparatus disclosed in and covered by such co-pending application.

The control mechanism covered in my above-identified co-pending application provides effective means for preventing anti-skid action by withdrawing braking action when the controlled braked wheel is either accelerating or decelerating above a predetermined minimum rate.

I have been able to provide controls by which it is possible to effect a braking action on the braked wheel as it is accelerating up to the ground speed of the aircraft without any possible detrimental effect being secured, and with resultant increase in braking efficiency.

Thus it is a general object of the present invention to improve the braking efficiency in anti-skid control systems, and especially to permit braking action when a predetermined rate of acceleration exists or is exceeded on the braked wheel.

A further object of the invention is to provide a minimum amount of special control apparatus in an anti-skid control system in order to permit braking action only during wheel acceleration by such special controls.

Yet another object of the invention is to provide improved means in an anti-skid control system for holding off brake pressure before wheel touchdown.

Another object of the invention is to provide a touchdown control circuit in anti-skid apparatus to energize the braking prevention means until wheel touchdown occurs and the braked wheel accelerates up to a predetermined speed, such as 10 miles per hour.

Yet another object of the invention is to provide a control switch in the touchdown circuit in the apparatus for opening when more than three-quarters of the total deflection occurs in an aircraft support strut by application of load thereto when the aircraft is on the ground to avoid any further control action by the touchdown circuit.

The foregoing and other objects and advantages of the present invention will be made more apparent as the specification proceeds.

A better understanding of the present invention may be had by reference to the accompanying drawing which shows an electric wiring diagram and other diagrammatically illustrated means associated therewith for the anti-skid control mechanism of the invention.

In order to understand the present invention in detail, reference should be had to the details of the control circuit shown in the accompanying drawing, and the numeral 1 is used to refer to the electrical anti-skid control system and mechanism of the invention as a whole.

A conventional power supply for the electrical anti-skid mechanism of the invention is shown by the battery 2 and this battery 2 connects through a conventional overload circuit breaker 3 positioned for easy reach by the pilot or other person in control of the mechanism 1 for rendering the circuit inoperative by disconnecting the power supply therefrom. Power is supplied to the general control circuit of the invention by a power supply lead 4 in which a control switch 5 is positioned. This control switch 5 is positioned in the aircraft or other carrier member and is only closed when the aircraft landing gear would be moved to an operative position. A two-position switch 6, the operation of which will be hereinafter described in more detail, is also connected in the power supply lead 4. The switch 6 in the position shown will transmit power to the remainder of the control circuit, and in its other position will transmit power to an indicator light 7 to indicate that some improper condition exists in the anti-skid control circuit and mechanism 1 and that the anti-skid system is inoperative all as explained hereinafter in detail.

Power for controlling the electrical anti-skid control mechanism 1 of the invention is basically provided by a conventional D. C. generator 8 suitably associated with and driven by the braked wheel with which the apparatus is to be used so that such generator 8 is driven at a speed proportional to the rotating speed of the wheel. Energy supplied from the generator 8, as long as the speed of such generator is increasing, will flow to a condenser 9 and through an operating coil 10 of a neutral position, polarized relay 11 used in the control circuit as one important element thereof. It will be seen that current will only flow through this circuit connecting the condenser 9, coil 10 and generator 8 when the generator is either accelerating or decelerating and when such acceleration or deceleration rate is of a sufficient predetermined amount that a current of required strength will flow in the coil 10, such coil 10 then will cause the relay 11 to be actuated for temporarily closing the circuit from the power supply lead 4 through a relay controlled contact 12 to either a lead 13 or a lead 14, as hereinafter described in more detail.

Thus should the generator 8 be accelerating over the predetermined rate, the relay 11 will close contact 12 to lead 13, which lead 13 connects to an operating coil 15 of a first normally open control relay 16. This control relay controls contact 17 that connects the power supply lead 4 to an operating coil 18 of a plunger 19 which is directly connected to a member, such as a solenoid valve 20, located in a hydraulic pressure brake operating circuit for the removal of braking pressure when the plunger 19 is energized. Hence, when the aircraft wheel is accelerating, as during the initial landing conditions, the plunger 19 is energized and no braking action may occur.

It is also very important that the application of brake pressure be prevented prior to the aircraft landing wheel actually being on the ground and in contact therewith to prevent the braked wheel from being locked in a fixed position when it first contacts the ground. Hence the power supply lead 4 also connects to a lead 21 in which a suitable relay controlled contact 22 is provided and is controlled by a normally closed relay 23 directly connected across the terminals of the generator 8 but which relay can be positioned in the aircraft with the other control apparatus. When the controlled wheel contacts the ground and rotates above a predetermined speed, such as about 10 miles an hour, the generator 8 is adapted to produce sufficient voltage therein as to actuate the relay 23 and open the contact 22. The contact 22 connects to a lead 24 which extends to the operating coil 18 for the solenoid valve 20 and supplies power thereto when the contact 22 is closed. This prevents brake actuation when the controlled wheel is not rotating above a predetermined speed so that no locked (braked) wheel condition can exist when the aircraft is initially landed. A further control contact or switch 25 is positioned on the aircraft landing gear strut and is normally closed, being open only when a predetermined load has been applied to the landing gear strut and when a conventional oleo strut, for example, would have been partially telescoped into a load carrying position by relative movement of different portions of the landing gear strut. Such relative movement would be used for opening the control contact or switch 25. The attached drawing clearly shows that the lead 21 connects through the normally closed contacts 22 and 25 to the operating coil 18 of the plunger 19 so that power will be transmitted to such solenoid operating coil at all times when the wheel unit is not rotating above a predetermined speed and no contact operative load is present upon the aircraft landing strut. This prevents braking action from existing or being applied prior to touchdown of the aircraft wheels. Also, if the wheel bounces off the ground and while brake pressure is applied, the contact 22 will be closed after the wheel drops below 10 miles per hour thereby releasing braking action. However, as long as load is applied to the aircraft support strut, the control switch or contact 25 will prevent any release of brake actuation through the circuit including the generator 8, and contacts 22 and 25 so that the other control means of the apparatus of the invention, hereinafter described, will be used for controlling brake actuation or release at such time.

Anti-skid operation after wheel touch-down

As indicated, the control relay 11 will cause removal of braking action during acceleration above a predetermined rate of the generator 8 and after the contacts 22 and 25 are opened. After such generator and the wheel associated therewith have reached ground speed, then a constant D. C. voltage would be provided by the generator and no current will flow through the operating coil 10 so that the relay 11 will take its neutral position and break the circuit to the energization coil 15 of the control relay 16 so that the plunger 19 will become deenergized and braking action can be applied by the pilot. Now let it be presumed that the pilot has applied too much braking energy to the aircraft wheel and a too rapid deceleration of such wheel starts to occur. At such time, the generator 8 will then appreciably reduce its output and electrical power stored in the condenser 9 will flow through the operating coil 10 of the relay 11 in an opposite direction to the charging current. This will cause the polarized control relay 11 to close the contact 12 to lead 14 which supplies power to an operating coil 26 of a second normally open control relay 27. When energized, this second control relay 27 closes a contact 28 connecting power supply lead 4 to the operating coil 18 of the plunger 19 and effectively removes braking action. Removal of the braking pressure presumably will permit the braked wheel to resume its approach towards the aircraft speed by rapid acceleration of the wheel speed, and, when such acceleration occurs, the control relay 11 would be actuated through its coil 10 to close contact 12 into contact with lead 13 and prevent any braking action until the wheel has reached aircraft speed and no further acceleration thereof occurs.

Locked wheel prevention controls

The second control relay 27 has a second control contact 29 connected thereto and controlled thereby. This control contact 29 when closed energizes an operating coil 30 of a normally open relay 31 which has a slow release circuit means connected thereto for operation when too rapid deceleration of the wheel occurs. This slow release circuit means comprises a condenser 32 connected in circuit with the operating coil 30 and with a resistance 33 connected in parallel with such operating coil 30 and a resistance 34 connected in series with the condenser 32. The closing of control contact 29 charges the condenser 32. Upon opening contact 29 this charging means is removed and current will slowly leak from such condenser 32 through the operating coil 30 to maintain such relay 31 and a relay-controlled contact 35 closed for a predetermined period, such as approximately two seconds. It will be seen that the contact 35 connects the power supply lead 4 to the operating coil 18 of the plunger 19 and maintains the braking means inoperative for the period of actuation of the control relay 31. Variation in the values of the resistance 33 provided in the control circuit for the relay permit adjustment of the time delay during which the relay 31 is maintained in its closed position.

The drawing also shows that a further control contact 36 is connected to the first control relay 16 and is closed when such relay is energized. The contact 36 connects the condenser 32 to the ground and effects a rapid, instantaneous discharge of such condenser through a relatively low value resistance connected to such contact when the wheel with which the control apparatus of the invention is associated starts to accelerate at usual rates encountered and the first control relay 16 is closed. Hence the slow opening action of the relay 31 is effectively terminated to permit rapid response of the control means of the invention to operating conditions in the braked wheel, when such wheel is properly returning to the aircraft ground speed.

Fail-safe means

Another function of the apparatus of the invention is that should any electrical current carrying element of the invention for some reason fail to release properly, or switch or contact means or relays of the invention remain closed longer than they should for correct control operation of the control system or circuit 1, means are provided for rendering the control system inoperative should such continued energization of a portion of the circuit occur. The means provided for such action comprise a motor timer 37 connected to the power supply line through one of the contacts 17 or 28 connected to the control relays 16 and 27, respectively, and to the contact 35, as well as through the contact 22 and the control contact 25. Energization of the motor timer 37 effects movement of a control arm 38 extending therefrom, with the extent of movement of the control arm being dependent upon the length of actuation of such motor timer. This motor timer is of a conventional construction and is of a type shown in U. S. Patent No. 2,513,410 wherein the control arm 38 automatically returns to a neutral or starting position at the end of each actuation of the motor timer member. The apparatus is so constructed and arranged that the normal period of energization of the motor timer 37, as when the first control relay 16 is instantaneously closed, or when the delayed release type of the relay 31 is energized and held closed for two seconds, will not permit operative movement of the control arm 38. Such control arm 38 is adapted to actuate the two-position control switch 6 to move such switch from its operative position as shown over to its opposite position when the light 7 is energized to show improper functioning of the control system 1 and to disconnect the control system from the brake circuit.

Yet a further control contact or switch 39 also is connected in the energization circuit for the motor timer 37. Such control contact 39 is connected to and carried by the support strut for the aircraft in a suitable manner so that such contact is closed only after the wheels have touched down. Hence the motor timer 37 and associated means cannot be brought into action by the touch-down control means, such as the contact 22 and the strut operated contact 25 which energize the operating coil 18 of the control plunger 19 until after landing conditions are established. The contact 39 will be closed, for example, when the aircraft support strut has been deflected 1 to 2 inches from its no load position, while contact 25 is opened when the strut is deflected ¾ of its full load movement. One suitable length of time of actuation for the motor timer 37 required to operate switch 6 would be 3.5 seconds so that if any portion of the circuit remained energized for such a length of time, then the motor timer unit would operate to disconnect the entire control system and manual operation of the brakes would be restored.

A support strut 40 is diagrammatically shown in the drawings and has the contacts 25 and 39 suitably secured thereto. The strut 40 journals a wheel 41 thereon. The control system 1, of course, functions to prevent skidding of this wheel 41 by the brake means provided therefor.

A suitable latching mechanism 42 is provided to hold the control switch in a position to maintain the anti-skid control 1 inoperative until the control switch is manually reset.

A limiter resistance 43 usually is connected in series as a protector resistor for the resistance 33.

It will be realized that the control system 1 responds very rapidly, for example, in a few hundredths of a second, to changes in speed of the braked wheel being controlled by the means of the invention.

In this specification, the ground speed of a braked wheel is a substantially uniform but usually changing rotational speed less than the aircraft speed due to slip of the wheel relative to the ground. When referring to too rapid a deceleration such as would actuate the second control relay 27, it means that the brake has produced more slip of the wheel 41 relative to the ground than is desired for efficient brake action, such as when a wheel moves towards a locked condition.

*Braking action on acceleration*

As an important feature of the invention, a condenser 44 is also connected to one of the outlet terminals of the generator 8 and it has the operating coil 45 of a sensitive D. C. voltage operated relay or relay member 46 connected thereto. The condenser 44 and relay 46 function in the same general manner as the condenser 9 and the relay 11 on change in the output of the generator 8, except as hereinafter explained. A conventional rectifier 47, which may be a selenium rectifier, is connected in parallel with the operating coil 45 so that current only flows through the operating coil 45 in one predetermined direction for actuating the relay upon wheel acceleration. Current flow in the opposite direction (when the wheel 41 is decelerating) from the generator 8 and condenser 44 flows through the rectifier 47 to the ground. In order to control the sensitivity of the relay 46 and the actuation thereof, an adjustable control resistance 48 is connected in circuit with the relay 46 and rectifier 47 from the condenser 44.

The function of the control relay 46 is to overcome the action of the control relay 11 in its operation of the first control relay 16 that is used for actuating the solenoid valve assembly 20 upon acceleration of the wheel 41 to prevent brake action at such time. The control relay 46 is so constructed, arranged, and adjusted so that it will be actuated upon a slightly greater predetermined acceleration rate than that which operates the relay 11 to close the contact 12 on lead 13. Hence upon such greater rate of acceleration, the control relay 46 will be actuated to short out the relay 11 and permit brake operation upon this greater-than-predetermined rate of wheel acceleration. In order to effect such action, a relay contact 49 is controlled by the relay 46 and when closed it connects the actuation coil 10 of the relay 11 to ground and prevents any energization of such relay or means controlled thereby at such time.

As a safety precaution in case the control relay 46 might be energized upon wheel acceleration prior to energization of the relay 11 and closing contact to the lead 13 after a deceleration period for the braked wheel, a second contact 50 is controlled by the relay 46 and it connects through a lead 51 to the fail-safe circuit portion of the apparatus of the invention, including the condenser 32, in order to discharge such condenser rapidly and prevent energization of the solenoid valve 20 through the relay 31.

A relatively low value resistance 52 is connected to lead 51.

From the foregoing, it will be seen that a novel brake control means has been provided for effecting brake action under certain wheel accelerating conditions so that the objects of the invention have been achieved.

While one complete embodiment of the invention has been disclosed herein, it will be appreciated that modification of this particular embodiment of the invention may be resorted to without departing from the scope of the invention as defined in the appended claims.

I claim:

1. An electrical anti-skid and brake control circuit comprising a wheel, brake means for said wheel, electrical means to prevent operation of said brake means, a direct current generator driven by said wheel, relay means connected to said generator to energize said electrical means and prevent brake operation upon acceleration of said wheel, a relay member connected to said generator in parallel to said relay means to be energized upon said wheel accelerating faster than a given rate, and circuit means controlled by said relay member for rendering inoperative said relay means upon energization and actuation of said relay member.

2. An electrical anti-skid and brake control circuit comprising a wheel, brake means for said wheel, electrical means to prevent operation of said brake means, a direct current generator driven by said wheel, relay means connected to said generator to energize said electrical means and prevent brake operation upon deceleration and acceleration of said wheel, a relay member connected to said generator by a separate circuit from that of said relay means to be energized upon said wheel accelerating faster than a given rate, and circuit means controlled by said relay member for making said relay means inoperative upon energization and actuation of said relay member.

3. In anti-skid apparatus, a wheel, brake means for said wheel, electrically operated control means for preventing operation of said brake means, a neutral position polarized relay, a source of electrical energy including a direct current generator driven by said wheel and connected to said relay for flow of current therethrough in one direction when said wheel is accelerating and in the opposite direction when said wheel is decelerating, a normally open control relay connected to said polarized relay and closed thereby when said wheel is accelerating, a second normally open control relay connected to said polarized relay to be closed thereby when said wheel is decelerating, both of said control relays being connected to said control means to operate it and prevent brake operation when either of said control relays is closed, slow release means actuated by said second control relay for retaining said brake means inoperative for a predetermined period, control members operatively associated with said first control relay for rendering said slow release means inoperative should said wheel accelerate during the predetermined period of slow release of said slow release means, a relay member connected to said generator in parallel to said polarized relay for actuation upon greater than a given acceleration rate of said wheel, and circuit means controlled by said relay member for grounding said polarized relay and said slow release means to prevent operation thereof when said relay member is actuated.

4. Electrical anti-skid and brake control circuit comprising a wheel, brake means for said wheel, electrical means to prevent operation of said brake means, power supply means for said electrical means, a direct current generator driven by said wheel, normally closed relay means connected to said generator and in circuit with said electrical means and power supply means to be actuated and opened by said generator upon rotation of said wheel above a predetermined speed, a support strut for said wheel which support strut is deflectable under load, and a control switch on said support strut and connected in series with said normally closed relay means to be opened when a given deflection occurs in said support strut.

5. Electrical anti-skid and brake control circuit comprising a wheel, brake means for said wheel, electrical means to prevent operation of said brake means, power supply means for said electrical means, a current producing direct current generator driven by said wheel, normally closed relay means connected to said generator and in circuit with said power supply means to be actuated and opened upon rotation of said wheel above a predetermined speed, and circuit means connecting said power supply means to said electrical means through said relay means.

6. In anti-skid apparatus, a wheel, brake means for said wheel, electrically operated control means for preventing operation of said brake means, a neutral position polarized relay, a direct current electric generator driven by the wheel and connected to said relay for flow of current therethrough in one direction when said wheel is more than normally accelerating and in the opposite direction when said wheel is more than normally decelerating, normally open control relay switches connected to said polarized relay and closed thereby when said polarized relay is operated, said control relay switches being connected to said control means to operate it and prevent brake operation when said control relay switches are closed, relay means connected in parallel to the polarized relay for energization when a predetermined extra high acceleration rate of said wheel is exceeded, contact is said relay means, and means connecting said contacts to said neutral position polarized relay and to ground for shorting out energization of the polarized relay when said relay means are energized to permit brake action when said wheel is accelerating above said extra high predetermined rate.

7. In electrical anti-skid apparatus, a wheel, brake means for said wheel, electrical means to prevent operation of said brake means when such electrical means are actuated, a direct current generator driven from said wheel, a source of electric power, circuit means, controlled by said generator for connecting said source of electric power to said electrical means for actuation when said wheel is accelerating or decelerating, means for rendering the circuit means inoperative when the wheel is accelerating above a predetermined rate, for varying sensitivity of said last-named means.

8. In electrical anti-skid apparatus, a wheel hydraulic brake means for said wheel, electric valve means to cut off passage of hydraulic pressure to said brake means when such electric valve means are actuated, a direct current generator driven from said wheel, an electric power source, control relay means, controlled by the generator, for connecting the power source to the electric valve means when the wheel is decelerating or accelerating beyond a normal amount, slow release relay means for locking-in the connection of the power source to the electric valve means to prevent too rapid reapplication of the brakes, and a second control relay means for overriding the operation of the control relay means and for releasing the slow release relay when the acceleration of the wheel exceeds a higher predetermined rate whereby the brakes may be reapplied.

References Cited in the file of this patent

UNITED STATES PATENTS

| | | |
|---|---|---|
| 2,256,287 | McCune | Sept. 16, 1941 |
| 2,663,521 | Yarber | Dec. 22, 1953 |

OTHER REFERENCES

Pages 54 and 55 of Jan. 1, 1953, Design News.